(12) United States Patent
Zhao et al.

(10) Patent No.: US 11,252,873 B2
(45) Date of Patent: Feb. 22, 2022

(54) SELF-ADAPTIVE CONTROL SYSTEM FOR FEED OPENING DEGREE OF ROUND BALER, AND CONTROL METHOD THEREFOR

(71) Applicant: JIANGSU UNIVERSITY, Suzhou (CN)

(72) Inventors: Zhan Zhao, Jiangsu (CN); Hedong Huang, Jiangsu (CN); Jianjun Yin, Jiangsu (CN); Zhong Tang, Jiangsu (CN); Chunjie Tian, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 531 days.

(21) Appl. No.: 16/333,300

(22) PCT Filed: May 18, 2017

(86) PCT No.: PCT/CN2017/084795
§ 371 (c)(1),
(2) Date: Mar. 14, 2019

(87) PCT Pub. No.: WO2018/171030
PCT Pub. Date: Sep. 27, 2018

(65) Prior Publication Data
US 2019/0239438 A1 Aug. 8, 2019

(30) Foreign Application Priority Data
Mar. 21, 2017 (CN) .......................... 201710168457.7

(51) Int. Cl.
*F15B 1/02* (2006.01)
*A01F 15/10* (2006.01)
(Continued)

(52) U.S. Cl.
CPC .......... *A01F 15/106* (2013.01); *A01F 15/085* (2013.01); *A01D 75/182* (2013.01); *A01D 90/14* (2013.01); *F15B 21/00* (2013.01)

(58) Field of Classification Search
CPC .. F15B 1/02; F15B 11/16; F15B 13/06; F15B 19/00; F15B 21/00; A01F 15/106; A01F 15/085; A01D 75/182; A01D 90/14
(Continued)

(56) References Cited

U.S. PATENT DOCUMENTS

| 3,913,473 A | 10/1975 | Meiers |
| 8,627,765 B2 * | 1/2014 | Reijersen Van Buuren ................ A01F 15/0705 100/40 |

(Continued)

FOREIGN PATENT DOCUMENTS

| CN | 2757534 Y | 2/2006 |
| CN | 203939793 U | 11/2014 |

(Continued)

*Primary Examiner* — Arpad Fabian-Kovacs
(74) *Attorney, Agent, or Firm* — Saliwanchik, Lloyd & Eisenschenk

(57) ABSTRACT

A self-adaptive control system comprises a feeding device, a rotary coder, a displacement sensor, a hydraulic regulation system and a controller, wherein, the input end of the controller is electrically connected with the rotary coder, the displacement sensor, a first oil pressure sensor and a second oil pressure sensor respectively, and the output end of the controller is electrically connected with a solenoid directional valve via an interlocking controller; the controller takes the bearing force of piston rods and the rotation speed and the rotation speed change rate of a feeding knife roller as input variables and takes the positions of the piston rods as an output variable, to establish a fuzzy control model of the feeding mouth opening of the feeding device, the extension and retraction of the piston rods in a left oil cylinder and (Continued)

a right oil cylinder under hydraulic driving are regulated actively by controlling a three-position four-way solenoid directional valve, and thereby self-adaptive control of the feeding mouth opening is achieved.

10 Claims, 5 Drawing Sheets

(51) Int. Cl.
*A01F 15/08* (2006.01)
*F15B 21/00* (2006.01)
*A01D 75/18* (2006.01)
*A01D 90/14* (2006.01)

(58) Field of Classification Search
USPC .......................................................... 701/50
See application file for complete search history.

(56) References Cited

U.S. PATENT DOCUMENTS

| | | | | |
|---|---|---|---|---|
| 9,775,298 B2 * | 10/2017 | Rosseel | ............... | A01D 89/002 |
| 9,949,438 B2 * | 4/2018 | Smith | ................. | A01F 15/0705 |
| 10,648,520 B2 * | 5/2020 | Boland | ................... | F16D 48/06 |

FOREIGN PATENT DOCUMENTS

| | | | | |
|---|---|---|---|---|
| CN | 104819182 A | * | 8/2015 | ............. F15B 15/14 |
| CN | 104838821 A | | 8/2015 | |
| CN | 105927614 A | * | 9/2016 | ............. F15B 19/00 |
| CN | 205717151 U | | 11/2016 | |
| CN | 205727151 U | | 11/2016 | |
| CN | 106258241 A | | 1/2017 | |
| CN | 107477051 A | * | 12/2017 | ............... F15B 1/02 |
| CN | 107503997 A | * | 12/2017 | ............. F15B 11/17 |
| CN | 107448440 B | * | 5/2019 | ............. F15B 21/08 |
| CN | 112377487 A | * | 2/2021 | ........... F15B 21/087 |
| EP | 1574124 A1 | | 9/2005 | |

* cited by examiner

SELF-ADAPTIVE CONTROL SYSTEM FOR FEED OPENING DEGREE OF ROUND BALER, AND CONTROL METHOD THEREFOR

CROSS REFERENCE TO RELATED APPLICATIONS

This application is a National Stage Application of International Application Number PCT/CN2017/084795, filed May 18, 2017; which claims priority to Chinese Application No. 201710168457.7, filed Mar. 21, 2017.

I. TECHNICAL FIELD

The present invention belongs to the technical field of automatic control of bundling machines, in particular to a self-adaptive control system for feeding mouth opening of a round bale bundling machine and a controlling method thereof.

II. BACKGROUND ART

Bundling machines can collect loose crop straws and grass, etc. for compress shaping to facilitate storage and transportation, and are key equipment for large-scale comprehensive utilization of the crop straws and grass, etc. Bundling machines may be categorized into square bale bundling machines and round bale bundling machines according to the formed shape, wherein, a round bale bundling machine utilizes the elastic teeth of a pick-up roller to pick up the material from the ground, feeds the material through a feeding device into a baling chamber, and rotates continuously to form a round bale. Round bale bundling machines are widely applied in farms and pastures.

The feeding device of a round bale bundling machine mainly consists of a feeding knife roller and a lower jaw plate, and is mainly used to pre-compress the picked up material and force the material into the baling chamber at a certain speed. The performance of the feeding device has direct influence on the uniformity and compactness of material baling. The material feeding performance mainly depends on the material properties and feeding amount, the structure and rotation speed of the feeding knife roller, and the feeding mouth opening. Each model of bundling machine has a fixed feeding knife roller structure and a rated rotation speed, and the feeding performance is improved mainly by adjusting the feeding mouth opening. At present, that task is still accomplished on the basis of personal experience. If the adjusted feeding mouth opening is relatively large, the pre-compression and throwing speed of the material will be relatively low, and the uniformity and compactness of material baling will be degraded; if the feeding mouth opening is relatively small, the power consumption of the feeding knife roller will be increased sharply, even resulting in feeding mouth jamming and damage of the lower jaw plate structure. Though an accumulator is added to the connecting oil cylinders on the lower jaw plate in some models so that the lower jaw plate moves and the feeding mouth opening increases by virtue of an oil absorption effect of the accumulator when the bearing force of the oil cylinders exceeds a preset value and the lower jaw plate and the feeding mouth opening return to their original positions when the bearing force of the oil cylinders is lower than the preset value, thereby alleviating the impact of material feeding amount to some extent, the response of the regulation is lagged and the regulation speed is slow; in addition, the original positions of the lower jaw plate and the feeding mouth opening have to be set manually; moreover, owing to the influence of the feeding device structure, the bearing force of the oil cylinders, the bearing force of the lower jaw plate, and the power consumption of the feeding knife roller are obviously in a non-linear relationship with each other. Consequently, the power consumption is high, the baling performance is instable, and a jamming fault occurs frequently. The material feeding amount during field operation of a bundling machine always varies dynamically, and even suddenly changes. Therefore, it is of important theoretical research significance and practical value to monitor the operating state of the feeding device in real time, analyze the feeding device structure and feeding dynamic characteristics, and design an automatic feeding mouth opening regulation device and a controlling method according to the properties of different materials and the change of feeding amount, so as to throw the material at steady pressure and initial speed into the baling chamber and thereby improve the service life of the feeding component, and improve the operating efficiency and reliability of the complete machine. However, there is no report on such researches yet at present.

III. CONTENTS OF THE INVENTION

The purpose of the present invention is to provide a self-adaptive control system for the feeding mouth opening of a round bale bundling machine and a controlling method thereof directed to the above-mentioned problems. In the present invention, a rotary coder is installed on the shaft end of the feeding knife roller to measure the rotation speed of the feeding knife roller, oil pressure sensors are installed in the oil circuits of the rod cavities and rodless cavities of the lower jaw plate actuating cylinders to calculate the bearing force of the oil cylinders, a displacement sensor is installed to measure the position of the lower jaw plate, and the state parameters of material feeding operation are acquired with a controller; a hydraulic regulation system for the feeding device is designed, the extension and retraction of the piston rods in the lower jaw plate actuating cylinders under hydraulic driving is regulated actively by controlling a three-position four-way solenoid directional valve, and the piston rods are regulated passively under load by virtue of an accumulator when the oil circuit is closed; on the premise of ensuring structural strength and safety factor of the feeding device and avoiding jamming faults of the feeding knife roller, the bearing force on the piston rods, and the rotation speed and rotation speed change rate of the feeding knife roller are taken as input variables, the positions of the piston rods are taken as an output variable, and a fuzzy controller of the feeding mouth opening is established; thus, self-adaptive control of the feeding mouth opening during operation is achieved, and thereby the service life of the feeding component is improved, and the operating efficiency and reliability of the complete machine are improved.

Technical scheme: a self-adaptive control system for feeding mouth opening of a round bale bundling machine, comprising a feeding device, a rotary coder, a displacement sensor, a hydraulic regulation system, and a controller, wherein, The rotary coder is installed on the shaft end of a feeding knife roller of the feeding device to measure the rotation speed of the feeding knife roller; the displacement sensor is installed on a left shaft of the feeding device, a measuring rod of the displacement sensor is connected to a left shaft pin to measure the displacement of the piston rods in left and right oil cylinders of the feeding device;

The hydraulic regulation system comprises a first oil pressure sensor, a first throttle valve, a three-position four-way solenoid directional valve, an oil pump, a second throttle valve, a check valve, an accumulator, a third throttle valve, and a second oil pressure sensor; the oil pump is connected to an oil tank through a pipeline, an oil supply port P of the three-position four-way solenoid directional valve is connected to the oil pump, an oil return port T of the three-position four-way solenoid directional valve is connected to the oil tank, and a service port A of the three-position four-way solenoid directional valve is connected to the check valve and oil circuits of rod cavities of the left oil cylinder and right oil cylinder sequentially through a pipeline; the service port B of the three-position four-way solenoid directional valve is connected to oil circuits of the rodless cavities of the left oil cylinder and right oil cylinder through a pipeline, the first oil pressure sensor is installed in the oil circuit of the rodless cavities of the left oil cylinder and right oil cylinder of the feeding device to measure the oil pressure in the rodless cavities; the second oil pressure sensor is installed in the oil circuit of rod cavities of the left oil cylinder and right oil cylinder of the feeding device to measure the oil pressure in the rod cavities; the accumulator is connected in parallel between the rod cavities of the left oil cylinder and right oil cylinder and the check valve;

The input end of the controller is electrically connected to the rotary coder, the displacement sensor, the first oil pressure sensor, and the second oil pressure sensor respectively, and the output end of the controller is electrically connected to the three-position four-way solenoid directional valve via an interlocking controller; the controller takes the bearing force of the piston rods and the rotation speed and rotation speed change rate of the feeding knife roller as input variables, and takes the positions of the piston rods as an output variable, to establish a fuzzy control model of the feeding mouth opening of the feeding device, and the extension and retraction of the piston rods of the left oil cylinder and right oil cylinder under hydraulic driving are regulated actively by means of the three-position four-way solenoid directional valve, and thereby self-adaptive control of the feeding mouth opening is achieved.

In the above scheme, the hydraulic regulation system further comprises a first throttle valve, a second throttle valve, and a third throttle valve, wherein, The first throttle valve is installed in the oil circuit between the service port B of the three-position four-way solenoid directional valve and the rod-less cavities of the left oil cylinder and right oil cylinder;

The second throttle valve is installed in the pipeline between the service port A of the three-position four-way solenoid directional valve and the check valve;

The third throttle valve is installed in the oil circuit between the accumulator and the rod cavities of the left oil cylinder and right oil cylinder.

In the above scheme, the hydraulic regulation system further comprises a first overflow valve and a second overflow valve; the first overflow valve is connected to the oil circuit of the rod cavities of the left oil cylinder and right oil cylinder;

The second overflow valve is connected to an outlet of the oil pump.

In the above scheme, the round bale bundling machine further comprises a display device, wherein, the output end of the controller is electrically connected to the display device, and the display device is configured to display the operation state of the feeding device.

A controlling method of the self-adaptive control system for feeding mouth opening of a round bale bundling machine, comprising the following steps:

step S1: during the operation of the bundling machine, the controller acquiring an output signal of the rotary coder in real time, and obtaining the rotation speed n of the feeding knife roller through calculation; the controller acquiring an output signal $P_1$ of the first oil pressure sensor and an output signal $P_1$ of the second oil pressure sensor in real time, and obtaining bearing force F of the piston rods of the left oil cylinder and right oil cylinder through calculation;

step S2: performing low-pass filtering calculation for the bearing force F of the piston rods to obtain an average value $F_0$, establishing array series $\{n_1, n_1 \ldots n_N\}$ and $\{F_{O1}, F_{O1} \ldots F_{ON}\}$ for n and $F_0$ respectively, with the current time $T_0$ as a zero point and the data sampling time dt of the controller 27 as an interval, where, N is the length of array series, $n_N$ and $F_{ON}$ are sample values of n and $F_0$ at the time $T_0-N \cdot dt$ respectively;

step S3: performing gray prediction calculation for the array series $\{n_1, n_1 \ldots n_N\}$ and $\{F_{O1}, F_{O1} \ldots F_{ON}\}$ respectively to obtain predicted values $n_M$ and $F_{OM}$ for n and $F_0$ at the time $T_0+M \cdot dt$, and performing differential calculation for $n_M$ to obtaining a predicted rotation speed change rate $\dot{n}_M$; and step S4: inputting the $n_M$, $F_{OM}$ and $\dot{n}_M$ obtained through prediction into the established fuzzy control model of the feeding mouth opening to obtain a strategy for regulating the positions L of the piston rods, controlling the electricity obtain of a left coil or right coil of the three-position four-way solenoid directional valve, then determining the electricity obtaining time of the left coil or right coil according to the movement speed $v_o$ of active extension and the movement speed $v_i$ of active retraction of the piston rods, and finally controlling electricity obtain of the left coil or right coil of the three-position four-way solenoid directional valve via the interlocking controller to drive the piston rods in the left oil cylinder and right oil cylinder to move and thereby achieve regulation of the feeding mouth opening.

In the above scheme, the fuzzy control model of the feeding mouth opening in the step S4 determines a domain of discourse of the bearing force F according to a permissible range of the bearing force F when the piston rods in the left oil cylinder and right oil cylinder are at different positions L, and the domain of discourse of F is adjusted self-adaptively along with the positions L of the piston rods, and domains of discourse of the rotation speed n and rotation speed change rate $\dot{n}$ of the feeding knife roller are determined according to permissible variation ranges of the rotation speed n and rotation speed change rate $\dot{n}$.

In the above scheme, the fuzzy control model of the feeding mouth opening in the step S4 establishes a fuzzy control rule list according to the determined strategy for regulating the positions L of the piston rods with the gray prediction values $F_{OM}$, $n_M$ and $\dot{n}_M$ of the bearing force F of the piston rods in the left oil cylinder and right oil cylinder and the rotation speed n and rotation speed change rate $\dot{n}$ of the feeding knife roller as input variables, and the positions L of the piston rods as an output variable, and the fuzzy control rule list is adjusted self-adaptively along with the positions L of the piston rods.

In the above scheme, in the step S4, the power consumption w of the feeding knife roller is calculated according to the rotation speed n and torque T of the feeding knife roller, optimization is carried out within a permissible range of the bearing force F of the piston rods in the oil cylinders that ensures structural strength and a safety factor and within a permissible range of the rotation speed n of the feeding knife roller that can avoid jamming faults of the feeding knife roller, with the purpose of forming a bale of the material at stable density ρ and reducing the power consumption w of the feeding knife roller, and thus a strategy for regulating the positions L of the piston rods is established.

In the above scheme, the fuzzy control model of the feeding mouth opening in the step S4 establishes a fuzzy control rule list according to the determined strategy for regulating the positions L of the piston rods with the gray prediction values $F_{OM}$, $n_M$ and $\dot{n}_M$ of the bearing force F of the piston rods in the left oil cylinder and right oil cylinder and the rotation speed n and rotation speed change rate $\dot{n}$ of the feeding knife roller as input variables, and the positions L of the piston rods as an output variable, and the fuzzy control rule list is adjusted self-adaptively along with the positions L of the piston rods.

In the above scheme, when the left coil of the three-position four-way solenoid directional valve in the step S4 is energized, the three-position four-way solenoid directional valve is in a left service position, the piston rods in the left oil cylinder and right oil cylinder extend actively, and the extension speed $v_o$ is regulated and controlled via the first throttle valve;

When the right coil of three-position four-way solenoid directional valve is energized, the three-position four-way solenoid directional valve is in a right service position, the piston rods in the left oil cylinder and right oil cylinder retract actively, and the retraction speed $v_i$ is regulated and controlled via the second throttle valve; and When neither the left coil nor the right coil of the three-position four-way solenoid directional valve is energized, the three-position four-way solenoid directional valve is in a middle service position, and the left oil cylinder, the right oil cylinder and the accumulator form a closed oil circuit system.

In the above scheme, the controlling method further comprises the following steps:

step S5: the controller acquiring an output signal of the displacement sensor in real time to determine the positions L of the piston rods, and the domain of discourse of the bearing force of the piston rods and the control rule list in the fuzzy control model of the feeding mouth opening are adjusted self-adaptively according to the positions L of the piston rods;

step S6: the controller obtaining the real-time power consumption w of the feeding knife roller through calculation according to the established model of the bearing force F and positions L of the piston rods, and torque T of the feeding knife roller; and step S7: the controller transmitting the state parameters, including the positions L and bearing force F of the piston rods, and rotation speed n and power consumption w of the feeding knife roller, to the display device through communication, so that the display device provides prompt and pre-warning information once the power consumption w or rotation speed n of the feeding knife roller exceed preset threshold value.

Compared with the prior art, the present invention attains the following beneficial effects: in the present invention, based on the analysis of structural mechanics of the feeding device and material feeding dynamic characteristic, the change characteristics of the bearing force of the piston rods in steady state and under instantaneous impact are extracted, an influence relation of the positions of the lower jaw plate actuating cylinders on the bearing force of the piston rods, density of formed bale, power consumption of the feeding knife roller, and structural strength of the feeding device is established, and a scheme of regulating the feeding mouth opening passively under instantaneous heavy load is obtained by designing the hydraulic regulation system of the feeding device; a control system is employed to combine the gray prediction under operation state with a self-adaptive fuzzy control method, the material is thrown at steady pressure and initial speed into the baling chamber by regulating the feeding mouth opening actively on a premise of ensuring the structural strength and a safety factor of the feeding device and avoiding jamming faults of the feeding knife roller, so as to form a bale with stable uniformity and compactness, and thereby the problems of degraded baling performance and jamming fault and structural damage of the feeding device resulted from material properties and feeding amount variation are solved effectively, and the overall operating efficiency, service life and reliability of the machine are improved.

IV. DESCRIPTION OF DRAWINGS

In the figures: 1—chassis; 2—first shaft; 3—grass blocking frame; 4—feeding knife roller; 5—lower jaw plate; 6—second shaft; 7—rotary coder; 8—left shaft; 9—left oil cylinder; 10—left shaft pin; 11—displacement sensor; 12—right shaft; 13—right oil cylinder; 14—right shaft pin; 15—first oil pressure sensor; 16—first overflow valve; 17—first throttle valve; 18—three-position four-way solenoid directional valve; 19—oil tank; 20—oil pump; 21—second overflow valve; 22—second throttle valve; 23—check valve; 24—accumulator; 25—third throttle valve; 26—second oil pressure sensor; 27—controller; 28—display device; 29—interlocking controller.

V. EMBODIMENTS

Hereunder the present invention will be further detailed in embodiments with reference to the accompanying drawings, but the protection scope of the present invention is not limited to those embodiments.

Figure 1:
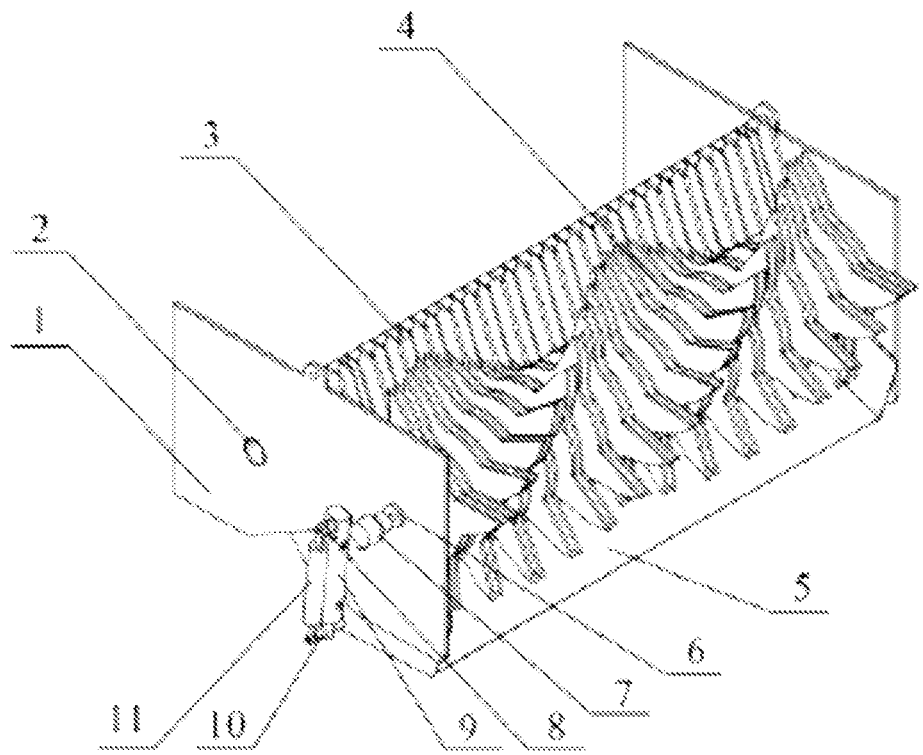
FIG. 1 is a 3D structural diagram of the feeding device in an embodiment of the present invention.
Figure 2:
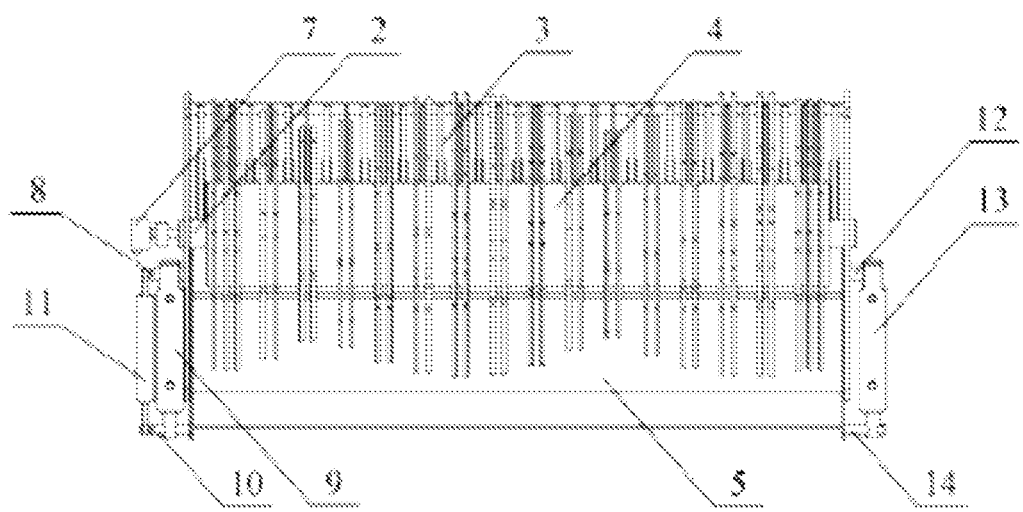
FIG. 2 is a front view of the feeding device in an embodiment of the present invention.
Figure 3:
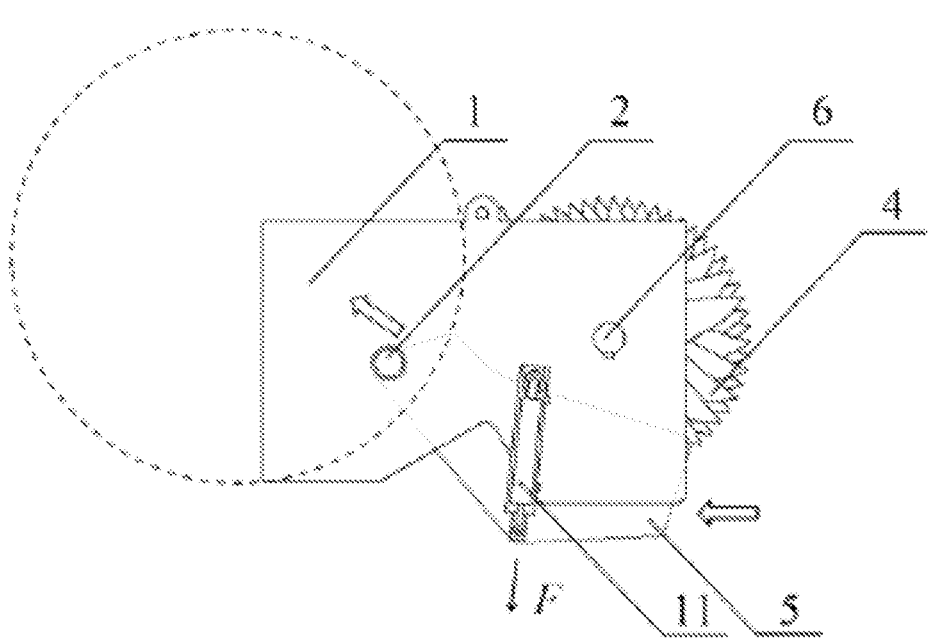
FIG. 3 is a left view of the feeding device in an embodiment of the present invention.

FIGS. 1, 2 and 3 show an embodiment of the self-adaptive control system for feeding mouth opening of a round bale bundling machine provided in the present invention. The self-adaptive control system for feeding mouth opening of a round bale bundling machine comprises a feeding device, a rotary coder 7, a displacement sensor 11, a hydraulic regulation system, and a controller 27.

A feeding knife roller 4 of the feeding device is installed on a chassis 1 via bearings and can rotate around a second shaft 6, and the rotary coder 7 is installed on the top of the second shaft 6 to measure the rotation speed of the feeding knife roller 4. A left shaft 8 of the feeding device is fixedly mounted on a left side plate of the chassis 1, a right shaft 12 of the feeding device is fixedly mounted on a right side plate of the chassis 1, and the axes of the left shaft 8 and right shaft 12 are in the same center line. The left oil cylinder 9 and the right oil cylinder 13 are two-way oil cylinders of the same model, the lug ring of the left oil cylinder 9 is mounted on the left shaft 8, the lug ring of the right oil cylinder 13 is mounted on the right shaft 12, so as to ensure that the left oil cylinder 9 and right oil cylinder 13 can swing freely around the left shaft 8 and right shaft 12 respectively.

The lower jaw plate 5 of the feeding device is located below the feeding knife roller 4, one end of the lower jaw plate 5 is mounted on the chassis 1 via a first shaft 2, the left end face and right end face of the lower jaw plate 5 are fixedly mounted with the left shaft pin 10 and the right shaft pin 14 respectively, and the axes of the left shaft pin 10 and right shaft pin 14 are in the same center line.

The piston rods in the left oil cylinder 9 and right oil cylinder 13 of the feeding device are connected to the left shaft pin 10 and the right shaft pin 14 respectively, and the lower jaw plate 5 can be driven by the piston rods in the left oil cylinder 9 and right oil cylinder 13 to rotate around the first shaft 2.

The lug ring of the displacement sensor 11 is mounted on the left shaft 8, the measuring rod of the displacement sensor 11 is connected to the left shaft pin 10, and the measuring rod of the displacement sensor 11 moves synchronously with the piston rod in the left oil cylinder 9, to measure the displacement of the piston rods in the left oil cylinder 9 and right oil cylinder 13 of the feeding device.

Under the action of gravity of the lower jaw plate 5 and the squeezing force in the material conveying process, the piston rods in the left oil cylinder 9 and right oil cylinder 13 are subjected to outward acting force along the piston rods, and the total bearing force of the two piston rods is denoted as F.

The grass blocking frame 3 is mounted above a material throwing port, and the mounting clearance between the grass blocking frame 3 and the cutter teeth of the feeding knife roller 4 is smaller than 1 mm, to prevent the material from being brought back by the feeding knife roller 4 during the rotation process.

Figure 4:
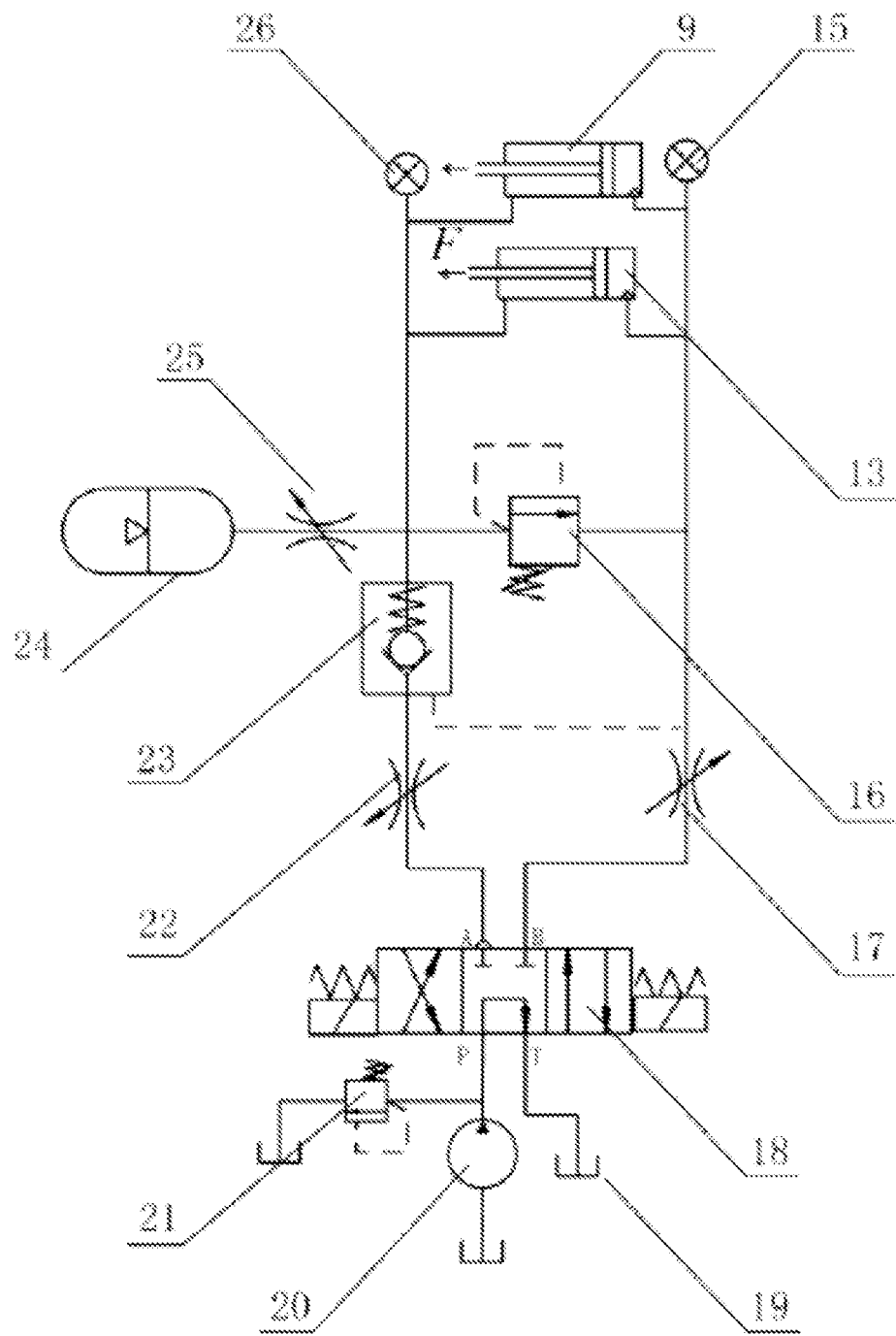
FIG. 4 is a schematic diagram of the hydraulic system of the feeding device in an embodiment of the present invention.

FIG. 4 is a schematic diagram of the hydraulic regulation system of the feeding device. The hydraulic regulation system comprises a first oil pressure sensor 15, a first overflow valve 16, a first throttle valve 17, a three-position four-way solenoid directional valve 18, an oil pump 20, a second overflow valve 21, a second throttle valve 22, a check valve 23, an accumulator 24, a third throttle valve 25, and a second oil pressure sensor 26; the oil pump 20 is connected to an oil tank 19 through a pipeline, an oil supply port P of the three-position four-way solenoid directional valve 18 is connected to the oil pump 20, an oil return port T of the three-position four-way solenoid directional valve 18 is connected to the oil tank 19, and a service port A of the three-position four-way solenoid directional valve 18 is connected to the second throttle valve 22, the check valve 23 and an oil circuit of rod cavities of the left oil cylinder 9 and right oil cylinder 13 sequentially through a pipeline; the three-position four-way solenoid directional valve 18 is a three-position four-way solenoid directional valve, the service port B of the three-position four-way solenoid directional valve 18 is connected to the first throttle valve 17 and the oil circuit of the rod-less cavities of the left oil cylinder 9 and right oil cylinder 13 sequentially through a pipeline, the first oil pressure sensor 15 is installed in the oil circuit of the rod-less cavities of the left oil cylinder 9 and right oil cylinder 13 of the feeding device to measure the oil pressure in the rod-less cavities; the second oil pressure sensor 26 is installed in the oil circuit of rod cavities of the left oil cylinder 9 and right oil cylinder 13 of the feeding device to measure the oil pressure in the rod cavities; the accumulator 24 and the third throttle valve 25 are connected in parallel between the oil circuit of the rod cavities of the left oil cylinder 9 and right oil cylinder 13 and the check valve 23.

Under the drive of the high-pressure oil outputted from the oil pump 20, the extension and retraction of the piston rods in the left oil cylinder 9 and right oil cylinder 13 are controlled actively via the three-position four-way solenoid directional valve 18; the accumulator 24 is connected to the oil circuit of the rod cavities of the left oil cylinder 9 and right oil cylinder 13 via the third throttle valve 25.

When the left coil of the three-position four-way solenoid directional valve 18 is energized, the three-position four-way solenoid directional valve 18 is in a left service position, and the high-pressure oil outputted from the oil pump 20 is inputted through the left valve spool of the three-position four-way solenoid directional valve 18 and the first throttle valve 17 into the rod-less cavities of the left oil cylinder 9 and right oil cylinder 13; the check valve 23 is opened under the action of the oil pressure, and the rod cavities of the left oil cylinder 9 and right oil cylinder 13 communicate with the oil tank 19 via the check valve 23, the second throttle valve 22, and the left valve spool of the three-position four-way solenoid directional valve 18; the piston rods in the left oil cylinder 9 and right oil cylinder 13 extend actively, and the extension speed $v_o$ is regulated and controlled via the first throttle valve 17.

When the right coil of the three-position four-way solenoid directional valve 18 is energized, the three-position four-way solenoid directional valve 18 is in a right service position, and the high-pressure oil outputted from the oil pump 20 is inputted through the right valve spool of the three-position four-way solenoid directional valve 18, the second throttle valve 22, and the check valve 23 into the rod cavities of the left oil cylinder 9 and right oil cylinder 13; the rod-less cavities of the left oil cylinder 9 and right oil cylinder 13 communicate with the oil tank 19 via the first throttle valve 17 and the right valve spool of the three-position four-way solenoid directional valve 18; the piston rods in the left oil cylinder 9 and right oil cylinder 13 retract actively, and the retraction speed $v_i$ is regulated and controlled via the second throttle valve 22.

When neither the left coil nor the right coil of the three-position four-way solenoid directional valve 18 is energized, the three-position four-way solenoid directional valve 18 is in a middle service position, and the high-pressure oil outputted from the oil pump 20 directly returns to the oil tank 19 through the middle valve spool of the three-position four-way solenoid directional valve 18 to realize unloading; the left oil cylinder 9, the right oil cylinder 13, and the accumulator 24 form a closed oil circuit system.

As can be seen from the structure of the feeding device, in the material feeding process, the piston rods in the left oil cylinder 9 and right oil cylinder 13 are subjected to outward acting force F along the piston rod. When the three-position four-way solenoid directional valve 18 is in the middle service position, the oil pressure $P_1$ in the rod cavities of the left oil cylinder 9 and right oil cylinder 13 increases as the acting force F increases; when the oil pressure $P_1$ is greater than a preset pre-charge pressure $P_0$ of the accumulator 24, the pressure oil in the rod cavities flows into the accumulator 24 through the third throttle valve 25, the piston rods in the left oil cylinder 9 and right oil cylinder 13 extend, and the extension speed is regulated and controlled via the third throttle valve 25; the oil pressure $P_1$ in the rod cavities of the left oil cylinder 9 and right oil cylinder 13 decreases as the acting force F decreases; when the oil pressure $P_1$ is smaller than the preset pre-charge pressure $P_0$ of the accumulator 24, the pressure oil in the accumulator 24 flows into the rod cavities through the third throttle valve 25, and the piston rods in the left oil cylinder 9 and right oil cylinder 13 retract to their initial positions.

The second oil pressure sensor 26 is installed in the oil circuit of the rod cavities of the left oil cylinder 9 and right oil cylinder 13 to measure the oil pressure $P_1$ in the rod-less cavities, and the first oil pressure sensor 15 is installed in the oil circuit of the rod-less cavities of the left oil cylinder 9 and right oil cylinder 13 to measure the oil pressure $P_2$ in the rod-less cavities; according to the total cross sectional area $S_1$ of the rod cavities and the total cross sectional area $S_2$ of the rod-less cavities of the left oil cylinder 9 and right oil cylinder 13, the acting force F on the piston rods can be calculated with the following formula: $F=P_1 \times S_1 - P_2 \times S_2$.

The second overflow valve 21 is connected to the outlet of the oil pump 20, the preset opening pressure of the second overflow valve 21 shall be lower than the rated output pressure of the oil pump 20, mainly for the purpose of system pressure regulation, i.e., the oil pressure in the system doesn't exceed the opening pressure of the second overflow valve 21 when the three-position four-way solenoid directional valve 18 is in the left service position or right service position.

The first overflow valve 16 is connected to the oil circuit of the rod cavities of the left oil cylinder 9 and right oil cylinder 13, and the preset opening pressure of the first overflow valve 16 is greater than the operating pressure of the system, mainly for the purpose of safety protection.

Figure 5:
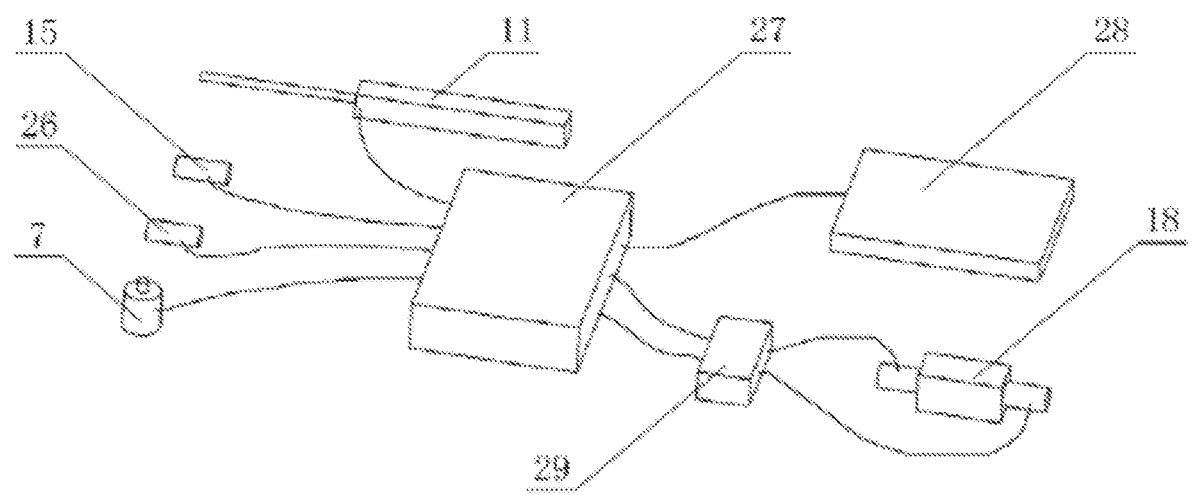
FIG. 5 is a schematic diagram of electric control circuit of the feeding device in an embodiment of the present invention.

FIG. 5 shows an electric circuit of the feeding device. The input end of the controller 27 is electrically connected to the rotary coder 7, the displacement sensor 11, the first oil pressure sensor 15, and the second oil pressure sensor 26 respectively, and the output end of the controller 27 is electrically connected to the three-position four-way solenoid directional valve 18 via an interlocking controller 29; the output signals from the displacement sensor 11, first oil pressure sensor 15, second oil pressure sensor 26 and rotary coder 7 are directly inputted to the controller 27; the controller 27 takes the bearing force of the piston rods and the rotation speed and rotation speed change rate of the feeding knife roller 4 as input variables, and takes the positions of the piston rods as an output variable, so as to establish a fuzzy control model of the feeding mouth opening of the feeding device, and the extension and retraction of the piston rods of the left oil cylinder 9 and right oil cylinder 13 under hydraulic driving are regulated actively by the three-position four-way solenoid directional valve 18, and thereby self-adaptive control of the feeding mouth opening is achieved.

The output end of the controller 27 is electrically connected to the display device 28, and communication output signals are inputted to the display device 28 to display the operation state of the feeding device.

Two-way switch control signals from the controller 27 are first inputted to the interlocking controller 29 and then inputted to the left coil and right coil of the three-position four-way solenoid directional valve 18 respectively, to control the service position of the three-position four-way solenoid directional valve 18. The function of the interlocking controller 29 is to prevent the left coil and right coil of the three-position four-way solenoid directional valve 18 from being energized at the same time.

Method for Establishing a Feeding Mouth Opening Control Model:

Feeding mouth opening control is a multi-objective optimization problem, which mainly involves analysis of the influence of the positions L of the piston rods in the left oil cylinder 9 and right oil cylinder 13 on the bearing force F of the piston rods, density ρ of formed bale, power consumption w of the feeding knife roller 4, and structural strength of the feeding device under different material and feeding amount conditions. The specific process is as follows:

Through simulation analysis of the material feeding process with test and EDEM, it is found that the bearing force F of the piston rods is a variable which varies dynamically and there are instantaneous impacts in the material feeding process, as may be characterized by the average value $F_0$ of the bearing force F and instantaneous impact $F_p$; $F_0$ and $F_p$ mainly depend on the properties of the material, material feeding amount K, positions L of the piston rods, and rotation speed n of the feeding knife roller 4.

The method for simulating the material feeding process with test and EDEM on the basis of a specific material (with the same rigidity and moisture content) is as follows:

The influence of different feeding amount K on the density ρ of a formed bale is analyzed for different positions L of the piston rods in the oil cylinders, and an equation of relation among the position L, the feeding amount K, and the bale density ρ is established: $\rho=f_1(K,L)$.

The influence of different feeding amount K on the torque T of the feeding knife roller is analyzed for different positions L of the piston rods in the oil cylinders, and an equation of relation among the position L, the feeding amount K, and the torque T of the feeding knife roller is established: $T=f_2(K,L)$.

The influence of different feeding amount K on the bearing force F of the piston rods is analyzed for different positions L of the piston rods in the oil cylinders, and an equation of relation among the position L, the feeding amount K, and the bearing force F of the piston rods is established: $F=f_3(K,L)$.

The magnitude of the bearing force of the lower jaw plate is analyzed for different feeding amounts K and different positions L of the piston rods in the oil cylinders.

A three-dimensional model of the feeding device is established for different positions L of the piston rod, static and dynamic calculation is carried out in Ansys software according to the bearing force F of the piston rods, torque T of the feeding knife roller, and bearing force load of the lower jaw plate, and a permissible range $[F_{Lmin}, F_{Lmax}]$ of the bearing force F of the piston rods is determined for different positions L of the piston rods, aiming at objectives of ensuring structural strength and a safety factor.

Materials with different properties are selected to carry out large feeding amount tests, the change of the rotation speed n of the feeding knife roller when a plugging fault of the feeding knife roller occurs is extracted for different positions L of the piston rods, and a permissible change range $[n_{min}, n_{max}]$ of the rotation speed n of the feeding knife roller is determined.

The power consumption w of the feeding knife roller is calculated according to the rotation speed n and torque T of the feeding knife roller: $w=n*T/9550$.

Optimization is carried out within a permissible range of the bearing force F of the piston rods that ensures structural strength and a safety factor and within a permissible range of the rotation speed n of the feeding knife roller that avoids jamming faults of the feeding knife roller, with a multi-objective optimization method, aiming at objectives of forming a bale from the material at stable bale density ρ and reducing the power consumption w of the feeding knife roller, and thus a strategy for regulating the positions L of the piston rods is established. The strategy for regulating the positions L of the piston rods may be different for materials with different properties (different rigidity and moisture content).

For example: (1) Under the condition of a specific feeding amount K, with ρ=max(ρ) as an objective (i.e., the density of the formed bale is maximum), the boundary conditions are:

$$\begin{cases} \rho = f_1 YK \mid LY \\ T = f_2 YK \mid LY \\ F = f_3 YK \mid LY \\ F \mid [F_L\min \mid F_L\max] \end{cases}$$

Through optimization and solution, the value of positions L of the piston rods in the oil cylinders can be obtained.

(2) Under the condition of a specific feeding amount K, with w=min (w) as an objective (i.e., the power consumption w of the feeding knife roller is minimum), the boundary conditions are:

$$\begin{cases} \rho = f_1 YK \mid LY \\ T = f_2 YK \mid LY \\ F = f_3 YK \mid LY \\ w = n \left| \dfrac{T}{9550} \right. \\ F \mid [F_L\min \mid F_L\max] \\ n \mid [n_{min}, n_{max\square}] \end{cases}$$

Through optimization and solution, the value of positions L of the piston rods in the oil cylinders can be obtained.

A fuzzy control model of the feeding mouth opening is established, with the bearing force F of the piston rods and the rotation speed n and rotation speed change rate ṅ of the feeding knife roller 4 as input variables, and the positions L of the piston rods as an output variable.

A domain of discourse of the bearing force F of the piston rods is determined according to the permissible range of the bearing force F for different positions L of the piston rods, and the domain of discourse of the bearing force F is adjusted self-adaptively with the positions L of the piston rods.

Domains of discourse of the rotation speed n and rotation speed change rate ṅ of the feeding knife roller 4 are determined according to the permissible variation ranges thereof.

A fuzzy control rule list is established according to the determined strategy for regulating the positions L of the piston rods, and the fuzzy control rule list is adjusted self-adaptively with the positions L of the piston rods.

Figure 6:
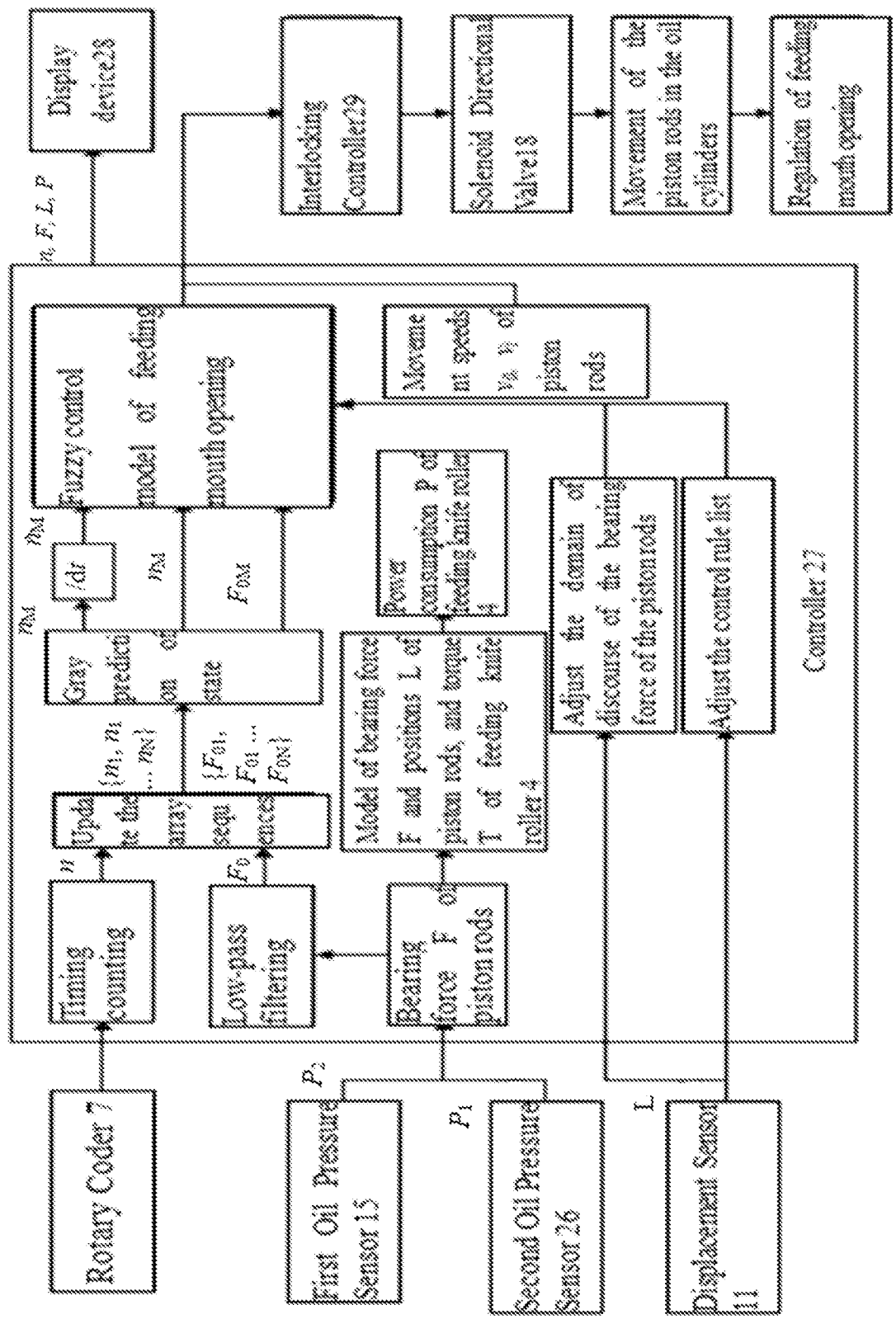
FIG. 6 is a schematic diagram of self-adaptive control of the feeding mouth opening in an embodiment of the present invention.

FIG. 6 shows a flow chart of the self-adaptive control method of the feeding mouth opening. The controller 27 employs an ARM as a core, and a fuzzy control model of the feeding mouth opening is established in the controller 27.

A Controlling Method of the Self-Adaptive Control System for the Feeding Mouth Opening of a Round Bale Bundling Machine, Comprising the Following Steps:

step S1: during the operation of the bundling machine, the controller 27 acquiring an output signal of the rotary coder 7 in real time, and obtaining the rotation speed n of the feeding knife roller 4 through timing counting and calculation; the controller 27 acquiring an output signal $P_1$ of the first oil pressure sensor 15 and an output signal $P_1$ of the second oil pressure sensor 26 in real time, and obtaining the bearing force F of the piston rods in the left oil cylinder 9 and right oil cylinder 13 through calculating with a formula $F = P_1 \times S_1 - P_2 \times S_2$;

step S2: performing low-pass filtering calculation for the bearing force F on the piston rods to obtain an average value $F_0$, establishing array sequences $\{n_1, n_1 \ldots n_N\}$ and $\{F_{01}, F_{01} \ldots F_{0N}\}$ of n and $F_0$ respectively, with the current time $T_0$ as a zero point and the data sampling time dt of the controller 27 as an interval, where, N is the length of array sequence, $n_N$ and $F_{0N}$ are sample values of n and $F_0$ at the time $T_0 - N \cdot dt$ respectively;

step S3: performing gray prediction calculation for the array sequences $\{n_1, n_1 \ldots n_N\}$ and $\{F_{01}, F_{01} \ldots F_{0N}\}$ respectively to obtain predicted values $n_M$ and $F_{0M}$ of n and $F_0$ at the time $T_0 + M \cdot dt$, and performing differential calculation for $n_M$ to obtain a predicted rotation speed change rate $\dot{n}_M$;

step S4: inputting $n_M$, $F_{0M}$ and $\dot{n}_M$ obtained through prediction into the established fuzzy control model of the feeding mouth opening to obtain a strategy for regulating the positions L of the piston rods, controlling the energization to a left coil or right coil of the three-position four-way solenoid directional valve 18, then determining the energization time of the left coil or right coil according to the movement speed $v_o$ of active extension and the movement speed $v_t$ of active retraction of the piston rods, and finally controlling the left coil or right coil of the three-position four-way solenoid directional valve 18 via the interlocking controller 29 to drive the piston rods in the oil cylinders to move and thereby achieve regulation of the feeding mouth opening;

step S5: the controller 27 acquiring an output signal of the displacement sensor 11 in real time to determine the positions L of the piston rods, and the domain of discourse of the bearing force F of the piston rods and the control rule list in the fuzzy controller of the feeding mouth opening are adjusted self-adaptively according to the positions L of the piston rods;

step S6: the controller 27 obtains the real-time power consumption w of the feeding knife roller 4 through calculation according to the established model of the bearing force F and positions L of the piston rods, and torque T of the feeding knife roller 4;

step S7: the controller 27 transmits the state parameters, including the positions L and bearing force F of the piston rods, and rotation speed n and power consumption w of the feeding knife roller 4, etc., through communication to the display device 28, so that the display device 28 provides prompt and pre-alarm information once the parameters, such as the power consumption w or rotation speed n of the feeding knife roller 4, etc., exceeds a corresponding preset threshold value.

In the step S4, in the fuzzy control model of the feeding mouth opening, a domain of discourse of the bearing force F is determined according to a permissible range of the bearing force F when the piston rods in the left oil cylinder 9 and right oil cylinder 13 are at different positions L, and the domain of discourse of F is adjusted self-adaptively with the positions L of the piston rods, and domains of discourse of the rotation speed n and rotation speed change rate ṅ of the feeding knife roller 4 are determined according to permissible variation ranges of the rotation speed n and rotation speed change rate ṅ. In the step S4, in the fuzzy control model of the feeding mouth opening, gray prediction values $F_{OM}$, $n_M$ and $ṅ_M$ of the bearing force F of the piston rods in the left oil cylinder 9 and right oil cylinder 13 and the rotation speed n and rotation speed change rate ṅ of the feeding knife roller 4 are taken as input variables, and the positions L of the piston rods are taken as an output variable, a fuzzy control rule list is established according to the determined strategy for regulating the positions L of the piston rods, and the fuzzy control rule list is adjusted self-adaptively with the positions L of the piston rods.

In the step S4, the power consumption w of the feeding knife roller 4 is calculated according to the rotation speed n and torque T of the feeding knife roller 4, optimization is carried out within a permissible range of the bearing force F of the piston rods in the oil cylinders that ensures structural strength and a safety factor and within a permissible range of the rotation speed n of the feeding knife roller 4 that can avoid jamming faults of the feeding knife roller 4, aiming at objectives of forming a bale of the material at stable density ρ and reducing the power consumption w of the feeding knife roller 4, and thus a strategy for regulating the positions L of the piston rods is established.

In the step S4, when the left coil of the three-position four-way solenoid directional valve 18 is energized, the three-position four-way solenoid directional valve 18 is in a left service position, the piston rods in the left oil cylinder 9 and right oil cylinder 13 extend actively, and the extension speed $v_o$ is regulated and controlled via the first throttle valve 17; when the right coil of three-position four-way solenoid directional valve 18 is energized, the three-position four-way solenoid directional valve 18 is in a right service position, the piston rods in the left oil cylinder 9 and right oil cylinder 13 retract actively, and the retraction speed $v_i$ is regulated and controlled via the second throttle valve 22; when neither the left coil nor the right coil of the three-position four-way solenoid directional valve 18 is energized, the three-position four-way solenoid directional valve 18 is in a middle service position, and the left oil cylinder 9, the right oil cylinder 13 and the accumulator 24 form a closed oil circuit system.

Hereunder the Present Invention Will be Further Detailed in an Example:

After the bundling machine is started up, the controller 27 acquires output signals from the rotary coder 7, displacement sensor 11, first oil pressure sensor 15, and second oil pressure sensor 26, and obtain the rotation speed n of the feeding knife roller 4, the positions L of the piston rods in the left oil cylinder 9 and right oil cylinder 13, and the corresponding bearing force F of the piston rods.

The controller 27 performs low-pass filtering calculation for the bearing force F of the piston rods in the left oil cylinder 9 and right oil cylinder 13, and obtains an average value $F_0$ of the bearing force F of the piston rods.

With the data sampling time dt of the controller 27 being an interval, array sequences $\{n_1, n_1 \ldots n_N\}$ and $\{F_{01}, F_{01} \ldots F_{0N}\}$ of n and $F_0$ from the time $T_0-N \cdot dt$ before N sampling periods to the current time are generated.

The controller 27 performs gray calculation for the array sequences $\{n_1, n_1 \ldots n_N\}$ and $\{F_{01}, F_{01} \ldots F_{0N}\}$ respectively to obtain predicted values $n_M$ and $F_{OM}$ of n and $F_0$ at the time $T_0+M \cdot dt$ after M sampling periods and performs differential calculation for $n_M$ to obtain a predicted rotation speed change rate $ṅ_M$.

The controller 27 inputs the obtained $n_M$, $F_{OM}$ and $ṅ_M$ into the internally established fuzzy control model of the feeding mouth opening to obtain a strategy for regulating the positions L of the piston rods, then determines the energization time of the left coil or right coil according to the movement speed $v_o$ of active extension and the movement speed $v_i$ of active retraction of the piston rods, and finally controls the left coil or right coil of the three-position four-way solenoid directional valve 18 via the interlocking controller 29 to drive the piston rods in the oil cylinders to move and thereby achieve active regulation of the feeding mouth opening.

In the initial operation stage of the bundling machine, the bearing force F of the piston rods in the left oil cylinder 9 and right oil cylinder 13 are low because the material feeding amount is low. Through calculation, the controller 27 regulates the feeding mouth opening to a minimum position actively by controlling the on/off of the right coil of the three-position four-way solenoid directional valve 18.

During continuous operation of the bundling machine, the material feeding amount always vary continuously, and the bearing force F of the piston rods in the left oil cylinder 9 and right oil cylinder 13 and the rotation speed n of the feeding knife roller 4 vary accordingly. At this time, through calculation, the controller 27 controls the on/off of the left coil or right coil of the three-position four-way solenoid directional valve 18, so as to automatically regulate the feeding mouth opening to an appropriate position actively.

After the feeding mouth opening is regulated, the controller 27 determines the domain of discourse of the bearing force F of the piston rods and the fuzzy control rule list again according to the regulated positions L of the piston rods, to improve the control performance.

The piston rods in the left oil cylinder 9 and right oil cylinder 13 are subjected to outward acting force F along the piston rods. If an instantaneous peak of the bearing force F of the piston rods occurs as a result of instantaneous sharp increase of the material feeding amount during continuous operation of the bundling machine, the average value $F_0$ of the bearing force will not be increased sharply, since the controller 27 performs low-pass filtering calculation for the bearing force F of the piston rods; furthermore, the rotation speed n will not change suddenly under the condition of the instantaneous feeding amount owing to the inertia of the feeding device. Therefore, it is possible that the controller 27 doesn't regulate the feeding mouth opening actively after calculation. In that case, the feeding mouth opening is regulated passively by means of the accumulator 24 installed in the oil circuit of the rod cavities of the left oil cylinder 9 and right oil cylinder 13; namely, when the oil pressure $P_1$ in the rod cavities of the left oil cylinder 9 and right oil cylinder 13 becomes higher than the preset pre-charge pressure $P_0$ of the accumulator 24 as a result of increase of the instantaneous feeding amount, the pressure oil in the rod cavities will flow through the third throttle valve 25 into the accumulator 24, the piston rods in the left oil cylinder 9 and right oil cylinder 13 will extend, and the feeding mouth opening will be increased; after the material feeding amount returns to a normal state, when $P_1$ is lower than $P_0$, the pressure oil in the accumulator 24 will flow through the third throttle valve 25 into the rod cavities, and the piston rods in the left oil cylinder 9 and right oil cylinder 13 will retract to their initial positions before the regulation.

Thus, the active regulation of the feeding mouth opening is mainly for the steady load condition in the continuous material feeding process, and is a continuous steady-state process; the passive regulation of the feeding mouth opening by means of the accumulator 24 is mainly against instantaneous increase conditions of the material feeding amount, and is a transient process.

During the operation of the bundling machine, the controller 27 can obtain the power consumption w of the feeding knife roller 4 through calculation according to the model of the bearing force F and positions L of the piston rods and the torque T of the feeding knife roller 4, and transmit the state parameters (positions L and bearing force F of the piston rods, rotation speed n and power consumption w of the feeding knife roller 4, etc.) to the display device 28 through communication, to enable the driver to learn about the operation state of the feeding device and adjust the advance speed of the machine according to the operation load condition of the material feeding device; if a parameter of the feeding knife roller 4 (e.g., power consumption w or rotation speed n, etc.) exceeds the preset threshold value, the display device 28 will provide prompt and pre-alarm information.

The present invention is mainly used for self-adaptive control of the clearance between the feeding knife roller 4 and the lower jaw plate 5 (i.e., the feeding mouth opening). It drives the three-position four-way solenoid directional valve 18 via the controller 27 to change the direction of hydraulic oil, so that the piston rods in the oil cylinders connected to the chassis 1 and the lower jaw plate 5 extend or retract, and thereby the feeding mouth opening of the bundling machine is regulated; the position of the lower jaw plate is measured via the displacement sensor 11, a rotary coder 7 is installed on a shaft end of the feeding knife roller 4 to measure the rotation speed of the feeding knife roller 4, and oil pressure sensors are installed in the oil circuits of the rod cavities and rod-less cavities of the oil cylinders to measure the bearing force and load of the oil cylinders; the influence of the material properties, feeding amount, and feeding mouth opening on the power consumption of the feeding knife roller and the structural strength of the lower jaw plate is analyzed theoretically and experimentally according to the structures of the feeding knife roller 4 and lower jaw plate 5, and a load model of the material feeding knife roller and a control model of the feeding mouth opening are established; during the operation of the bundling machine, the controller 27 acquires signals about the feeding mouth opening, rotation speed of the feeding knife roller, and bearing force of the oil cylinders in real time, and exercises self-adaptive regulation of the feeding mouth opening. The controller 27 employs a gray system model to predict the rotation speed of the feeding knife roller and the bearing force of the oil cylinders, to solve the problem of control hysteresis. Under the self-adaptive control of the feeding mouth opening in the system, the material is thrown at stable pressure and initial speed into the baling chamber, and thereby the instability of baling performance resulted from non-uniform feeding amount is reduced, jamming faults of the feeding knife roller as a result of sharp feeding amount increase are avoided, and the driver can adjust the advance speed of the machine according to the operation load condition of the material feeding device. Thus, the service life of the feeding component can be prolonged, and the overall operating efficiency and reliability of the machine are improved.

It should be understood: though the present invention is described according to the examples, it does not mean that each of the examples only includes an independent technical scheme. The description in such a way in this document is only for the purpose of clarity. Those skilled in the art should comprehend the description in entirety, and the technical schemes in the examples may be combined appropriately to form other embodiments that can be understood by those skilled in the art.

The above detailed description is provided herein only to describe some feasible examples of the present invention rather than limit the protection scope of the present invention. Any equivalent example or modification implemented without departing from the spirit of the present invention shall be deemed as falling in the protection scope of the present invention.

The invention claimed is:

1. A self-adaptive control system for feeding a mouth opening of a round bale bundling machine, comprising a feeding device, a rotary coder, a displacement sensor, a hydraulic regulation system, and a controller, wherein, the rotary coder is installed on the shaft end of a feeding knife roller of the feeding device to measure the rotation speed of the feeding knife roller; a lug ring of the displacement sensor is mounted on a left shaft, a measuring rod of the displacement sensor is connected to a left shaft pin to measure the displacement of the piston rods in the left oil cylinder and right oil cylinder of the feeding device;

the hydraulic regulation system comprises a first oil pressure sensor, a three-position four-way solenoid directional valve, an oil pump, a check valve, an accumulator, and a second oil pressure sensor, wherein, the oil pump is connected to an oil tank through a pipeline, an oil supply port P of the three-position four-way solenoid directional valve is connected to the oil pump, an oil return port T of the three-position four-way solenoid directional valve is connected to the oil tank, and a service port A of the three-position four-way solenoid directional valve is connected to the check valve and an oil circuit of rod cavities of the left oil cylinder and right oil cylinder sequentially through a pipeline; a service port B of the three-position four-way solenoid directional valve is connected to an oil circuit of the rod-less cavities of the left oil cylinder and right oil cylinder through a pipeline, the first oil pressure sensor is installed in the oil circuit of the rod-less cavities of the left oil cylinder and right oil cylinder of the feeding device to measure the oil pressure in the rod-less cavities; the second oil pressure sensor is installed in the oil circuit of rod cavities of the left oil cylinder and right oil cylinder of the feeding device to measure the oil pressure in the rod cavities; the accumulator is connected in parallel between the oil circuit of the rod cavities of the left oil cylinder and right oil cylinder and the check valve; and the input end of the controller is electrically connected to the rotary coder, the displacement sensor, the first oil pressure sensor, and the second oil pressure sensor respectively, and the output end of the controller is electrically connected to the three-position four-way solenoid directional valve via an interlocking controller; the controller takes the bearing force of the piston rods and the rotation speed and rotation speed change rate of the feeding knife roller as input variables, and takes the positions of the piston rods as an output variable, so as to establish a fuzzy control model of the feeding mouth opening of the feeding device, and the extension and retraction of the piston rods in the left oil cylinder and right oil cylinder under hydraulic driving are regulated actively by controlling the three-position four-way solenoid directional valve, and thereby self-adaptive control of the feeding mouth opening is achieved.

2. The self-adaptive control system for a feeding mouth opening of a round bale bundling machine according to claim 1, wherein, the hydraulic regulation system further comprises a first throttle valve, a second throttle valve, and a third throttle valve;
the first throttle valve is installed in the oil circuit between the service port B of the three-position four-way solenoid directional valve and the rod-less cavities of the left oil cylinder and right oil cylinder;
the second throttle valve is installed in the pipeline between the service port A of the three-position four-way solenoid directional valve and the check valve; and
the third throttle valve is installed in the oil circuit between the accumulator and the rod cavities of the left oil cylinder and right oil cylinder.

3. The self-adaptive control system fora feeding mouth opening of a round bale bundling machine according to claim 1, wherein, the hydraulic regulation system further comprises a first overflow valve and a second overflow valve;
the first overflow valve is connected to the oil circuit of the rod cavities of the left oil cylinder and right oil cylinder; and
the second overflow valve is connected to an outlet of the oil pump.

4. The self-adaptive control system for a feeding mouth opening of a round bale bundling machine according to claim 1, further comprising a display device, wherein, the output end of the controller is electrically connected to the display device, and the display device is configured to display the operation state of the feeding device and provide alarms.

5. A controlling method of the self-adaptive control system for a feeding mouth opening of a round bale bundling machine according to claim 1, comprising the following steps:
step S1: during the operation of the bundling machine, the controller acquiring an output signal of the rotary coder in real time, and obtaining the rotation speed n of the feeding knife roller through calculation; the controller acquiring an output signal P1 of the first oil pressure sensor and an output signal P1 of the second oil pressure sensor in real time, and obtaining bearing force F of the piston rods in the left oil cylinder and right oil cylinder through calculation;
step S2: performing low-pass filtering calculation for the bearing force F on the piston rods to obtain an average value F0, establishing array sequences {n1, n1 ... nN} and {F01, F01 ... F0N} for n and F0 respectively, with the current time T0 as a zero point and the data sampling time dt of the controller as an interval, where, N is the length of array sequence, nN and F0N are sample values of n and F0 at the time T0-N·dt respectively;
step S3: performing gray prediction calculation for the array sequences {n1, n1 ... nN} and {F01, F01 ... F0N} respectively to obtain predicted values nM and F0M for n and F0 at the time T0+M·dt, and performing differential calculation for nM to obtain a predicted rotation speed change rate $\dot{n}$M; and
step S4: inputting nM, F0M and $\dot{n}$M obtained through prediction into the established fuzzy control model of the feeding mouth opening to obtain a strategy for regulating the positions L of the piston rods, controlling the energization of a left coil or right coil of the three-position four-way solenoid directional valve, then determining the energization time of the left coil or right coil according to the movement speed vo of active extension and the movement speed vi of active retraction of the piston rods, and finally controlling energization of the left coil or right coil of the three-position four-way solenoid directional valve via the interlocking controller to drive the piston rods in the left oil cylinder and right oil cylinder to move and thereby achieve regulation of the feeding mouth opening.

6. The controlling method of the self-adaptive control system for a feeding mouth opening of a round bale bundling machine according to claim 5, wherein, in the step S4, in the fuzzy control model of the feeding mouth opening, a domain of discourse of the bearing force F is determined according to a permissible range of the bearing force F when the piston rods in the left oil cylinder and right oil cylinder are at different positions L, and the domain of discourse of F is adjusted self-adaptively with the positions L of the piston rods, and domains of discourse of the rotation speed n and rotation speed change rate $\dot{n}$ of the feeding knife roller are determined according to permissible variation ranges of the rotation speed n and rotation speed change rate $\dot{n}$.

7. The controlling method of the self-adaptive control system for a feeding mouth opening of a round bale bundling machine according to claim 6, wherein, in the step S4, in the fuzzy control model of the feeding mouth opening, gray prediction values F0M, nM and $\dot{n}$M of the bearing force F of the piston rods in the left oil cylinder and right oil cylinder and the rotation speed n and rotation speed change rate $\dot{n}$ of the feeding knife roller are taken as input variables, and the positions L of the piston rods are taken as an output variable, a fuzzy control rule list is established according to the determined strategy for regulating the positions L of the piston rods, and the fuzzy control rule list is adjusted self-adaptively with the positions L of the piston rods.

8. The controlling method of the self-adaptive control system for a feeding mouth opening of a round bale bundling machine according to claim 7, wherein, in the step S4, the power consumption w of the feeding knife roller is calculated according to the rotation speed n and torque T of the feeding knife roller, optimization is carried out within a permissible range of the bearing force F of the piston rods in the oil cylinders that ensures structural strength and a safety factor and within a permissible range of the rotation speed n of the feeding knife roller that can avoid jamming faults of the feeding knife roller, aiming at objectives of forming a bale of the material at stable density ρ and reducing the power consumption w of the feeding knife roller, and thus a strategy for regulating the positions L of the piston rods is established.

9. The controlling method of the self-adaptive control system for a feeding mouth opening of a round bale bundling machine according to claim 5, wherein, in the step S4, when the left coil of the three-position four-way solenoid directional valve is energized, the three-position four-way solenoid directional valve is in a left service position, the piston rods in the left oil cylinder and right oil cylinder extend actively, and the extension speed vo is regulated and controlled via the first throttle valve;
is energized, the three-position four-way solenoid directional valve is in a right service position, the piston rods in the left oil cylinder and right oil cylinder retract actively, and the retraction speed vi is regulated and controlled via the second throttle valve; and when neither the left coil nor the right coil of the three-position four-way solenoid directional valve is energized, the three-position four-way solenoid directional valve is in a middle service position, and the left oil cylinder, the right oil cylinder and the accumulator form a closed oil circuit system.

10. The controlling method of the self-adaptive control system for a feeding mouth opening of a round bale bundling machine according to claim 5, further comprising the following steps:

step S5: the controller acquires an output signal of the displacement sensor in real time to determine the positions L of the piston rods, and the domain of discourse of the bearing force of the piston rods and the control rule list in the fuzzy control model of the feeding mouth opening are adjusted self-adaptively according to the positions L of the piston rods;

step S6: the controller obtains the real-time power consumption w of the feeding knife roller through calculation according to the established model of the bearing force F and positions L of the piston rods, and torque T of the feeding knife roller; and step S7: the controller transmits the state parameters including the positions L and bearing force F of the piston rods, and rotation speed n and power consumption w of the feeding knife roller through communication, to the display device, so that the display device provides prompt and pre-alarm information once the power consumption w or rotation speed n of the feeding knife roller exceeds a corresponding preset threshold value.

* * * * *